May 3, 1927.
C. W. MUELLER
1,627,448
BIRD PERCH
Filed Sept. 23, 1924
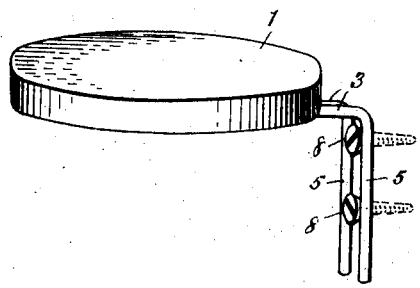
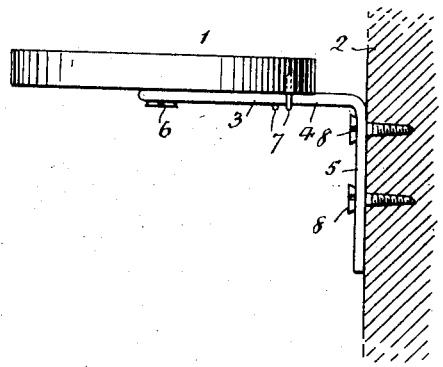
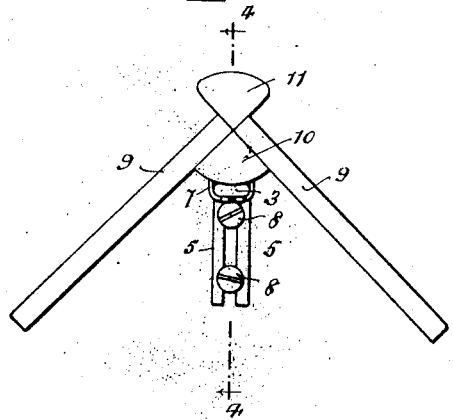
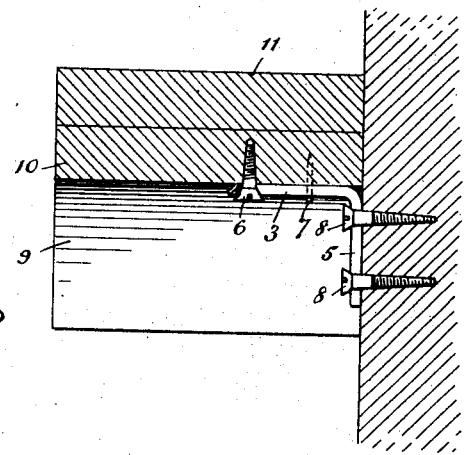
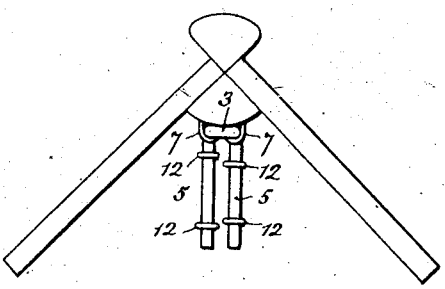
WITNESSES
H. J. Walker
S. W. Foster
INVENTOR
Charles W. Mueller
BY
ATTORNEYS Patented May 3, 1927.

1,627,448

UNITED STATES PATENT OFFICE.

CHARLES WILLIAM MUELLER, OF JERSEY CITY, NEW JERSEY.

BIRD PERCH.

Application filed September 23, 1924. Serial No. 739,398.

This invention relates to bird perches, an object of the invention being to provide a perch which can be easily and quickly placed in position against a house or other support and will be safe and firm when in position yet can be quickly removed for cleaning purposes or to prevent other birds from taking possession when the owner is absent.

A further object is to provide a perch which is so constructed as to present a smooth surface and to prevent possibility of the bird injuring himself or his feathers when occupying the perch as no obstruction nor uneven surface is provided above the top of the perch.

A further object is to provide a perch of this character which is simple in construction, neat and attractive in appearance, strong and durable in use.

With these and other objects in view, the invention consists in certain novel features of construction and combinations and arrangements of parts which will be more fully hereinafter described and pointed out in the claims.

In the accompanying drawings—

Figure 1 is a perspective view illustrating one form of my improved perch;

Figure 2 is a view in side elevation of the perch shown in Figure 1;

Figure 3 is an end view illustrating a modified form of perch;

Figure 4 is a view in longitudinal section on the line 4—4 of Figure 3;

Figure 5 is a view similar to Figure 3 illustrating another modification.

Referring particularly to Figures 1 and 2, 1 represents a platform which is preferably circular in form, and 2 a wall or any other support to which the perch is to be connected. 3 represents my improved bracket which is composed of a single run of wire bent at a point intermediate its ends and forming a pair of straight normally horizontal arms 4, the extremities of which are bent at right angles forming a pair of normally vertical spaced rods 5.

This bracket 3 is secured to the under face of the platform 1, preferably by means of a screw 6 projected between the two members of the bracket and having its head portion overlapping or overlying the material of the bracket at the bend thereof. Furthermore, I preferably employ a pair of staples 7 which are driven through the individual runs of the wire and into the bottom of the platform 1.

To secure the bracket and the perch to the support indicated by the reference numeral 2, I preferably provide a pair of screws 8, 8, which are driven into the wall or building and have their heads projected from the surface of said wall sufficiently to allow the two runs of the wire constituting the bracket to engage the screws and clamp them. In other words, the extremity of the bracket constitutes a bifurcated portion which can be forced downwardly over the screws and by frictional engagement and by reason of the inherent resiliency of the bracket, the bracket will be rigidly held in place but can be easily removed by an upward movement imparted to the bracket.

In Figures 3, 4 and 5 I illustrate a modified form of perch in which a pair of boards 9, 9 is secured at an angle upon a bar 10, and a rounded bar 11 is secured above the boards 9 at the juncture thereof and constitutes a smooth surfaced bar which can be readily grasped by the feet of the bird.

With this modified form of perch I employ the same construction of supporting bracket as that above described with this exception, however, that the bracket is entirely under or within the outline of the perch so that the perch when secured to its support or wall will be tight against the wall.

In Figure 5 I illustrate a modification in which I show a series of staples 12 through which the members 5 of the bracket 3 can be projected to support the perch.

It will be noted that with my improved perch the entire support and fastening means are below the upper surface of the perch so that the bird in moving about on the perch cannot injure his feathers by contact with an uneven surface. Furthermore, the perch is easily removable so that it can be cleaned and replaced, and the device as a whole constitutes a neat and attractive article.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. A perch, comprising a platform, an angle bracket consisting of a double run of parallel integral members connected at one end and constituting a horizontal and a vertical depending bifurcated portion integral with one end of the horizontal portion, said horizontal portion secured at its end to the under face of the platform devices securing each run of the wire to the platform at a point removed from the free end of said horizontal portion, and said vertical depending bifurcated portion adapted to engage a pair of headed devices secured to a wall, said platform adapted at one end to fit against the wall.

2. A perch, comprising a platform, an angle bracket consisting of a double run of parallel integral members connected at one end and constituting a horizontal and a vertical depending bifurcated portion integral with one end of the horizontal portion, said horizontal portion secured at its end under the face of the platform, devices securing each run of the wire to the platform at a point removed from the free end of said horizontal portion, and said vertical depending bifurcated portion adapted to engage a pair of headed devices secured to a wall.

CHARLES WILLIAM MUELLER.